US00RE44959E

(19) United States
(12) Reissued Patent
Paulraj et al.

(10) Patent Number: US RE44,959 E
(45) Date of Reissued Patent: Jun. 24, 2014

(54) METHOD AND WIRELESS SYSTEMS USING MULTIPLE ANTENNAS AND ADAPTIVE CONTROL FOR MAXIMIZING A COMMUNICATION PARAMETER

(75) Inventors: Arogyaswami J. Paulraj, Stanford, CA (US); Peroor K. Sebastian, Mountain View, CA (US); David J. Gesbert, Nice (FR); Jose Tellado, Sunnyvale, CA (US)

(73) Assignee: Intel Corporation, Santa Clara, CA (US)

(21) Appl. No.: 10/702,053

(22) Filed: Nov. 5, 2003

Related U.S. Patent Documents

Reissue of:
(64) Patent No.: 6,351,499
Issued: Feb. 26, 2002
Appl. No.: 09/464,372
Filed: Dec. 15, 1999

(51) Int. Cl.
*H04B 7/02* (2006.01)
*H04L 1/02* (2006.01)

(52) U.S. Cl.
USPC ..... 375/267; 375/285; 375/299; 375/346; 375/347; 370/334; 455/101

(58) Field of Classification Search
USPC ..... 375/267, 285, 299, 346, 347; 370/334; 455/101
See application file for complete search history.

(56) References Cited

U.S. PATENT DOCUMENTS 5,592,490 A * 1/1997 Barratt et al. ..... 370/310
5,642,353 A * 6/1997 Roy et al. ..... 370/329
5,815,488 A 9/1998 Williams et al.
5,828,658 A * 10/1998 Ottersten et al. ..... 370/310
5,933,421 A 8/1999 Alamouti et al.
6,058,105 A 5/2000 Hochwald et al. ..... 370/310
6,064,662 A 5/2000 Gitlin et al.

(Continued)

FOREIGN PATENT DOCUMENTS

EP 0951091 A2 10/1999 ..... H01Q 3/26
WO WO98/09381 3/1998
WO WO98/09385 3/1998 ..... H04B 7/02

OTHER PUBLICATIONS

Paulraj, A., *Taxonomy of space-time processing for wireless networks*, IEE Proc—Radar Sonar Navig., vol. 145, No. 1, Feb. 1998.

*Primary Examiner* — Ted Wang
(74) *Attorney, Agent, or Firm* — Cool Patent, P.C.

(57) ABSTRACT

A method of maximizing a communication parameter, such as data capacity, signal quality or throughput of a channel between a transmit unit with M transmit antennas and a receive unit with N receive antennas and a communication system such as a wireless network (including networks with multiple access techniques such as TDMA, FDMA, CDMA, OFDMA) employing the method. The data is first processed to produce parallel spatial-multiplexed streams $SM_i$, where i=1 . . . k, which are converted or mapped to transmit signals $TS_p$, where p=1 . . . M, assigned for transmission from the M transmit antennas. Corresponding receive signals $RS_j$, where j=1 . . . N, are received by the N receive antennas of the receiver and used to assess a quality parameter, such as a statistical signal parameter including SINR, SNR, power level, level crossing rate, level crossing duration of the signal of a predetermined threshold and reception threshold, or a parameter of the data, such as BER or packet error rate. The quality parameter is used to adaptively adjust k as well as other parameters such as coding and mapping to transmit antennas such that the communication parameter of the channel is maximized.

57 Claims, 6 Drawing Sheets

(56) References Cited

U.S. PATENT DOCUMENTS 6,067,290 A * 5/2000 Paulraj et al. ..... 370/329
6,097,771 A 8/2000 Foschini ..... 375/346
6,108,565 A * 8/2000 Scherzer ..... 455/562
6,144,711 A * 11/2000 Raleigh et al. ..... 375/347
6,175,550 B1 1/2001 Van Nee ..... 370/206

* cited by examiner

METHOD AND WIRELESS SYSTEMS USING MULTIPLE ANTENNAS AND ADAPTIVE CONTROL FOR MAXIMIZING A COMMUNICATION PARAMETER

Matter enclosed in heavy brackets [ ] appears in the original patent but forms no part of this reissue specification; matter printed in italics indicates the additions made by reissue.

FIELD OF THE INVENTION

The present invention relates generally to wireless communication systems and methods of using transmit and receive units with multiple antennas to adapt the transmissions to channel conditions and maximize a communication parameter.

BACKGROUND OF THE INVENTION

Wireless communication systems serving stationary and mobile wireless subscribers are rapidly gaining popularity. Numerous system layouts and communications protocols have been developed to provide coverage in such wireless communication systems.

The wireless communications channels between the transmit and receive devices are inherently variable and thus their quality fluctuates. Hence, their quality parameters also vary in time. Under good conditions wireless channels exhibit good communication parameters, e.g., high signal-to-noise ratio, large data capacity and/or throughput. At these times significant amounts of data can be transmitted via the channel reliably. However, as the channel changes in time, the communication parameters also change. Under altered conditions former data rates, coding techniques and data formats may no longer be feasible. For example, when the channel performance is degraded the transmitted data may experience excessive corruption yielding unacceptable communication parameters. For instance, transmitted data can exhibit excessive bit-error rates or packet error rates. The degradation of the channel can be due to a multitude of factors such as general noise in the channel, multi-path fading, loss of line-of-sight path, excessive Co-Channel Interference (CCI) and other factors.

By reducing CCI the carrier-to-interference (C/I) ratio can be improved and the spectral efficiency increased. Specifically, improved C/I ratio yields higher per link bit rates, enables more aggressive frequency re-use structures and increases the coverage of the system.

It is also known in the communication art that transmit units and receive units equipped with antenna arrays, rather than single antennas, can improve receiver performance. Antenna arrays can both reduce multipath fading of the desired signal and suppress interfering signals or CCI. Such arrays can consequently increase both the range and capacity of wireless systems. This is true for wireless cellular telephone and other mobile systems as well as Fixed Wireless Access (FWA) systems.

In mobile systems, a variety of factors cause signal degradation and corruption. These include interference from other cellular users within or near a given cell. Another source of signal degradation is multipath fading, in which the received amplitude and phase of a signal varies over time. The fading rate can reach as much as 200 Hz for a mobile user traveling at 60 mph at PCS frequencies of about 1.9 GHz. In such environments, the problem is to cleanly extract the signal of the user being tracked from the collection of received noise, CCI, and desired signal portions summed at the antennas of the array.

In FWA systems, e.g., where the receiver remains stationary, signal fading rate is less than in mobile systems. In this case, the channel coherence time or the time during which the channel estimate remains stable is longer since the receiver does not move. Still, over time, channel coherence will be lost in FWA systems as well.

Antenna arrays enable the system designer to increase the total received signal power, which makes the extraction of the desired signal easier. Signal recovery techniques using adaptive antenna arrays are described in detail, e.g., in the handbook of Theodore S. Rappaport, Smart Antennas, Adaptive Arrays, Algorithms, & Wireless Position Location; and Paulraj, A. J et al., "Space-Time Processing for Wireless Communications", IEEE Signal Processing Magazine, Nov. 1997, pp. 49-83.

Prior art wireless systems have employed adaptive modulation of the transmitted signals with the use of feedback from the receiver as well as adaptive coding and receiver feedback to adapt data transmission to changing channel conditions. However, effective maximization of channel capacity with multiple transmit and receive antennas is not possible only with adaptive modulation and/or coding.

U.S. Pat. No. 5,592,490 to Barratt et al., U.S. Pat. No. 5,828,658 to Ottersten et al., and U.S. Pat. No. 5,642,353 Roy III, teach about spectrally efficient high capacity wireless communication systems using multiple antennas at the transmitter; here a Base Transceiver Station (BTS) for Space Division Multiple Access (SDMA). In these systems the users or receive units have to be sufficiently separated in space and the BTS uses its transmit antennas to form a beam directed towards each receive unit. The transmitter needs to know the channel state information such as "spatial signatures" prior to transmission in order to form the beams correctly. In this case spatial multiplexing means that data streams are transmitted simultaneously to multiple users who are sufficiently spatially separated.

The disadvantage of the beam-forming method taught by Barratt et al., Ottersten et al., and Roy III is that the users have to be spatially well separated and that their spatial signatures have to be known. Also, the channel information has to be available to the transmit unit ahead of time and the varying channel conditions are not effectively taken into account. Finally, the beams formed transmit only one stream of data to each user and thus do not take full advantage of times when a particular channel may exhibit very good communication parameters and have a higher data capacity for transmitting more data or better signal-to-noise ratio enabling transmission of data formatted with a less robust coding scheme.

U.S. Pat. No. 5,687,194 to Paneth et al. describes a Time Division Multiple Access (TDMA) communication system using multiple antennas for diversity. The proposed system exploits the concept of adaptive transmit power and modulation. The power and modulation levels are selected according to a signal quality indicator fed back to the transmitter.

Addressing the same problems as Paneth et al., U.S. Pat. No. 5,914,946 to Avidor et al. teaches a system with adaptive antenna beams. The beams are adjusted dynamically as the channel changes. Specifically, the beams are adjusted as a function of a received signal indicator in order to maximize signal quality and reduce the system interference.

The last two patents certainly go far in the direction of adaptively changing multiple antenna systems to optimize performance with varying channel conditions. However, further improvements are desirable. In particular, it would be desirable to develop a system where both the transmit unit and receive unit take full advantage of multiple antennas to not only adaptively change the modulation and/or coding but also use a suitable diversity scheme, and spatial multiplexing order all at the same time. These adaptive changes would help to ensure that the communication parameters of the channel remain maximized while the channel varies. Furthermore, it would be an advance in the art to develop a communications system which could take advantage of multiple antennas at the transmit and receive unit to adapt to changing channel conditions and maximize any of a number of desirable communication parameters such as data capacity, signal-to-noise ratio and throughput. This would permit the system to continuously adapt to the type of data being transmitted via the channel.

OBJECTS AND ADVANTAGES OF THE INVENTION

Accordingly, it is a primary object of the present invention to provide a method to maximize a communication parameter in a channel between a wireless transmit unit and receive unit, both using multiple antennas. Specifically, the method should permit the system to continuously optimize data capacity, signal-to-noise ratio, signal quality, throughput and other desirable parameters while the channel varies.

It is a further object of the invention to provide a method which takes full advantage of multiple antennas at the transmit unit and receive unit to optimize a communication parameter of the channel using a quality parameter derived from the received signals.

Yet another object of the invention is to provide a method as indicated above in any wireless communication system using any combination of multiple access techniques such as TDMA, FDMA, CDMA, and OFDMA.

It is also an object of the invention to provide a wireless communication system taking advantage of adaptive coding, spatial multiplexing, and antenna diversity to continuously maxmize the desired communication parameters under varying channel conditions.

The above objects and advantages, as well as numerous other improvements attained by the method and apparatus of the invention are pointed out below.

SUMMARY

The objects and advantages of the invention are achieved by a method of maximizing a communication parameter, such as data capacity, signal quality or throughput of a channel between a transmit unit with M transmit antennas and a receive unit with N receive antennas. The data is first processed to produce parallel spatial-multiplexed streams $SM_i$, where i=1 . . . k. Then, the spatial-multiplexed streams $SM_i$ are converted or mapped to transmit signals $TS_p$, where p=1 . . . M, assigned for transmission from the M transmit antennas.

The transmitted signals propagate through the channel and are received in the form of receive signals $RS_j$, where j=1 . . . N, by the N receive antennas of the receiver. The receive signals $RS_j$ are used to assess a quality parameter. The quality parameter is used to adaptively adjust k such that the communication parameter of the channel is maximized.

In a preferred embodiment, each of the spatial-multiplexed streams $SM_i$ is processed by a coding unit to produce coded streams $CS_h$, where h=1 . . . k'. The quality parameter is utilized in the transmitter to adjust the coding, e.g., by changing k', used by the coding unit. The coding unit can be a space-time coder, a space-frequency coder, an adaptive modulation rate coder or other suitable coding device. The space-time and space-frequency coders can use different coding and modulation rates.

At the receiver the receive signals $RS_j$ are receive processed to reproduce the spatial-multiplexed streams $SM_i$. The quality parameter can be obtained from the receive processed streams $SM_i$. This can be accomplished by a statistical unit which examines streams $SM_i$. In this case the quality parameter can be signal-to-interference ratio, signal-to-noise ratio, power level, level crossing rate, level crossing duration of the signal of a predetermined threshold and reception threshold. Alternatively or in addition the quality parameter can be obtained from reconstituted data. In this case the quality parameter can be the bit-error-rate (BER) or packet error rate.

The mapping step at the transmitter preferably also includes a transmit processing step implemented by a transmit processing block. The quality parameter is then preferably also used for adjusting the processing of the transmit processing block.

Although the quality parameter is typically evaluated at the receiver and fed back or sent to the transmitter in any suitable way, e.g., over a reciprocal channel as used in Time Division Duplexed (TDD) systems, the analysis of the receive signals to derive the quality parameter can be performed by the transmitter. This can be advantageous, e.g., when the receiver does not have sufficient computational resources to derive the quality parameter.

The step of processing the data at the transmitter can be performed by using any suitable coding technique. For example, Space-Time coding or Space-Frequency coding can be used. Meanwhile, the transmit signals $TS_p$ are formatted in accordance to at least one multiple access technique such as TDMA, FDMA, CDMA, OFDMA.

The method of the invention can be used between any transmit and receive units including portable and stationary devices. In one embodiment, the method is employed in a wireless network such as a cellular communication system. In this case the method can be used to improve the communication parameter in both downlink and uplink communications.

The method of the invention can be used in existing systems having multiple receive and transmit antennas. The method also permits other useful methods to be employed concurrently. In particular, it is advantageous to use the techniques of the invention together with interference canceling.

A communication system employing the method of the invention achieves adaptive maximization of the communication parameter between its transmit and receive units. The transmit unit has a processing device for processing the data to produce the parallel spatial-multiplexed streams $SM_i$ and an antenna mapping device for converting streams $SM_i$ to transmit signals $TS_p$ and mapping them to the M transmit antennas. The communication system is equipped with a unit for assessing the quality parameter of received signals $RS_j$. In addition, the communication system has a device for adaptively adjusting k based on the quality parameter to maximize the communication parameter. This device can be located in the transmit unit.

The unit for assessing the quality parameter is a statistical unit and is preferably located in the receive unit. Of course, the statistical unit can be located in the transmit unit, as may be advantageous when the receive unit has insufficient resources or power to support the statistical unit.

The communication system also has a coding unit for processing streams $SM_i$ to produce coded streams $CS_h$ (h=1 . . . k'). The device for adjusting k then also has a mechanism for adjusting k'. The coding unit can be a space-time coder, space-frequency coder or an adaptive modulation and coding rate coder. Preferably, a database of codes and transmit processing parameters is connected to the coding unit and the antenna mapping device.

An adaptive controller is connected to the processing device, the coding unit and the antenna mapping device. The adaptive controller adjusts these based on the quality parameter. Alternatively, the adaptive controller is connected just to the processing device and the antenna mapping device and adjusts them based on the quality parameter.

The communication system can employ any one or more of the available multiple access techniques such as TDMA, FDMA, CDMA, OFDMA. This can be done in a wireless system, e.g., a cellular communication system.

A detailed description of the invention and the preferred and alternative embodiments is presented below in reference to the attached drawing figures.

DETAILED DESCRIPTION

Figure 1:
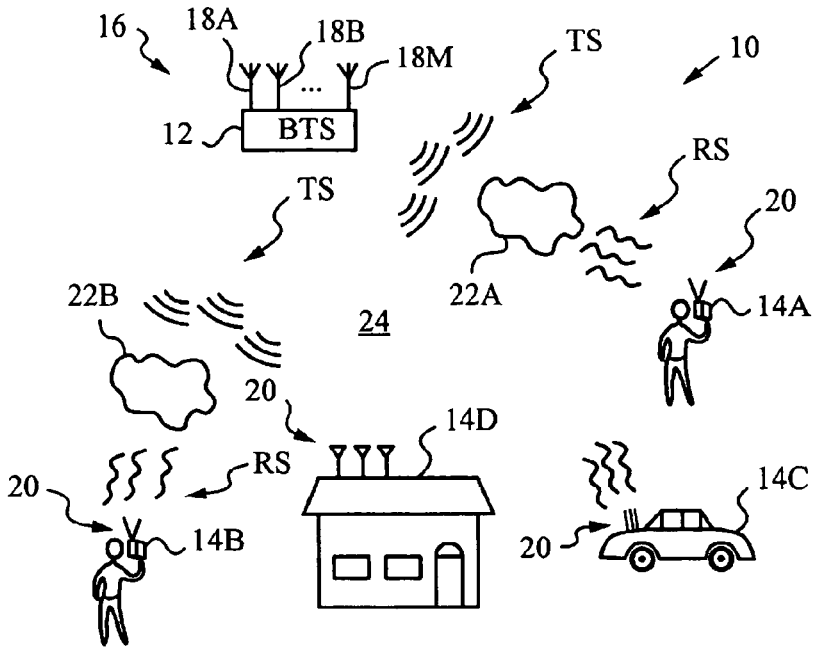
FIG. 1 is a simplified diagram illustrating a communication system in which the method of the invention is applied.
Figure 2:
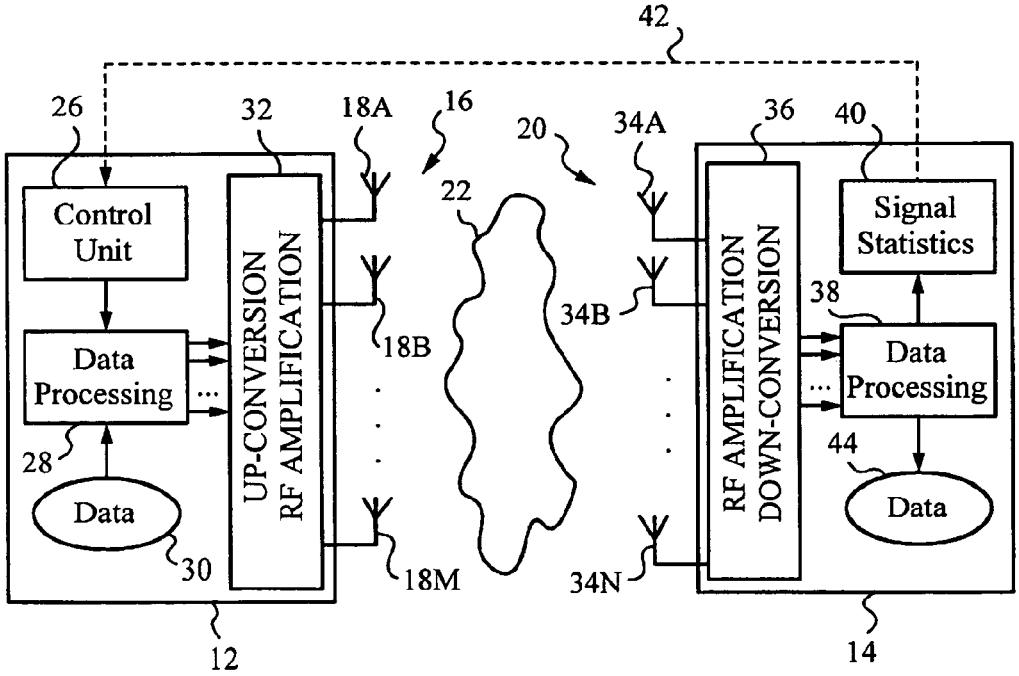
FIG. 2 is a simplified block diagram illustrating the transmit and receive units according to the invention.

The method and wireless systems of the invention will be best understood after first considering the high-level diagrams of FIGS. 1 and 2. FIG. 1 illustrates a portion of a wireless communication system 10, e.g., a cellular wireless system. For explanation purposes, the downlink communication will be considered where a transmit unit 12 is a Base Transceiver Station (BTS) and a receive unit 14 is a mobile or stationary wireless user device. Exemplary user devices include mobile receive units 14A, 14B, 14C which are portable telephones and car phones and stationary receive unit 14D, which can be a wireless modem unit used at a residence or any other fixed wireless unit. Of course, the same method can be used in uplink communication from wireless units 14 to BTS 12.

BTS 12 has an antenna array 16 consisting of a number of transmit antennas 18A, 18B, . . . , 18M. Receive units 14 are equipped with antenna arrays 20 of N receive antennas (for details see FIGS. 2, 4). BTS 12 sends transmit signals TS to all receive units 14 via channels 22A and 22B. For simplicity, only channels 22A, 22B between BTS 12 and receive units 14A, 14B are indicated, although BTS 12 transmits TS signals to all units shown. In this particular case receive units 14A, 14B are both located within one cell 24. However, under suitable channel conditions BTS 12 can transmit TS signals to units outside cell 24, as is known in the art.

The time variation of channels 22A, 22B causes transmitted TS signals to experience fluctuating levels of attenuation, interference, multi-path fading and other deleterious effects. Therefore, communication parameters of channels 22A, 22B such as data capacity, signal quality or throughput undergo temporal changes. Thus, channels 22A, 22B can not at all times support efficient propagation of high data rate signals RS or signals which are not formatted with a robust coding algorithm. Antenna array 16 at BTS 12 can be used for spatial multiplexing, transmit diversity, beam-forming to reduce interference, increase array gain and achieve other advantageous effects. Antenna arrays 20 at receive units 14 can be used for spatial multiplexing, interference canceling, receive diversity, increased array gain and other advantageous effects. All of these methods improve the capacity of channels 22A, 22B. The method of the invention finds an optimum combination of these techniques chosen adaptively with changing conditions of channels 22A, 22B. In other words, the method of the invention implements an adaptive and optimal selection of order of spatial multiplexing, order of diversity as well as rate of coding and bit-loading over transmit antenna array 16 to antenna array 20.

Specifically, the method of the invention addresses these varying channel conditions by adaptively maximizing one or more communication parameters based on a quality parameter. FIG. 2 illustrates the fundamental blocks of transmit unit 12 and one receive unit 14 necessary to employ the method. Transmit unit 12 has a control unit 26 connected to a data processing block 28 for receiving data 30 to be formatted, coded and mapped to antennas 18A, 18B, . . . , 18M for transmission therefrom. An up-conversion and RF amplification block 32 supplies the transmit signals TS to antennas 18A, 18B, . . . , 18M.

On the other side of the link, receiving unit 14 has N antennas 34A, 34B, . . . , 34N in its array 20 for receiving signals RS. An RF amplification and down-conversion block 36 processes RS signals and passes them to data processing block 38. A signal statistics unit 40 assesses a quality parameter of RS signals and/or recovered data 44 and feeds back quality parameter to control unit 26 of transmitter 12. The feedback is indicated by dashed line 42. Using this quality parameter, unit 26 controls data processing 28 to ensure appropriate spatial multiplexing, diversity processing, coding and mapping of data 30 such that a selected communication parameter or parameters are continuously maximized.

Figure 3:
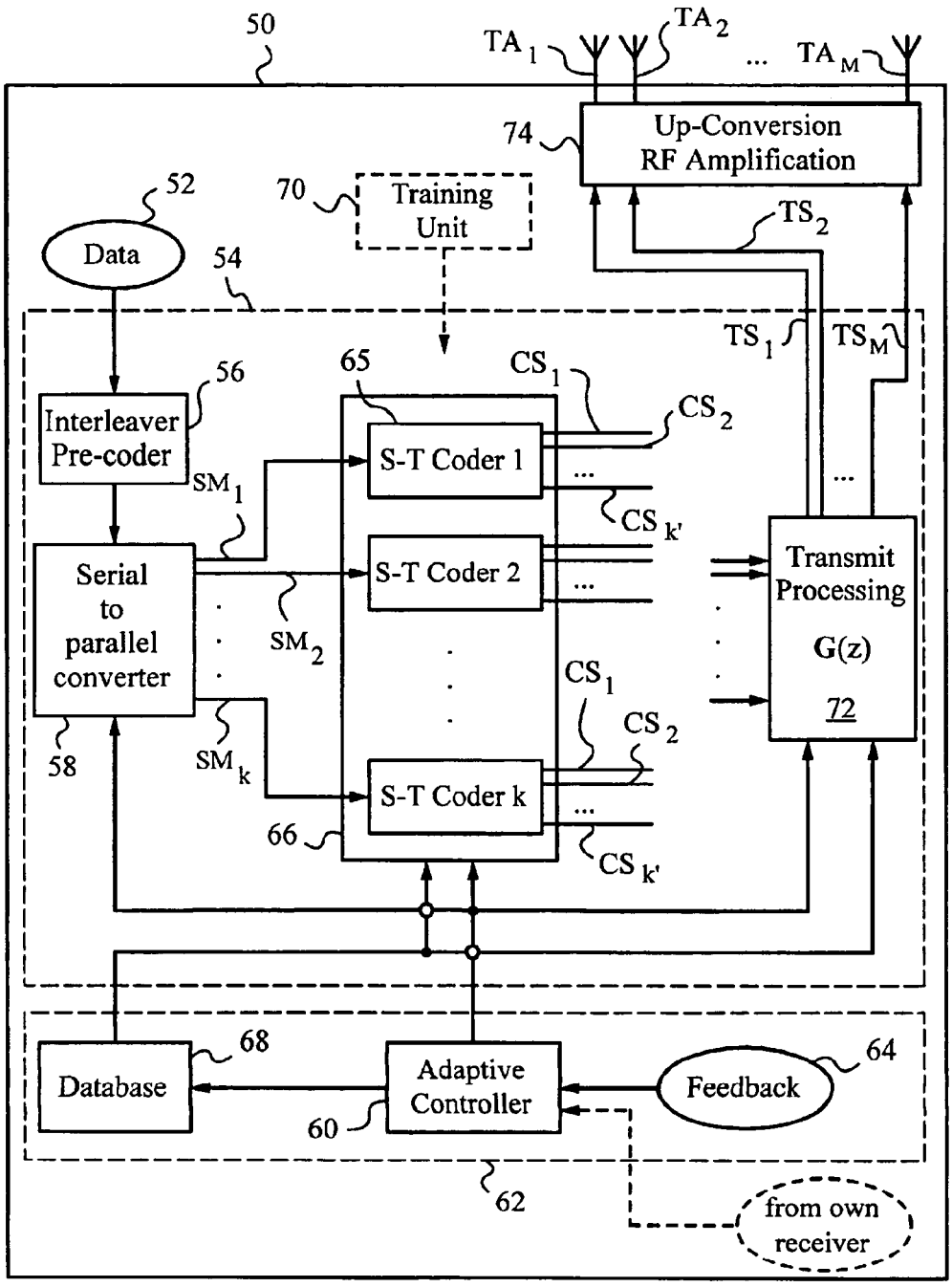
FIG. 3 is a block diagram of an exemplary transmit unit in accordance with the invention.

The details of a preferred embodiment of a transmit unit 50 for practicing the method of the invention are shown in FIG. 3. Data 52 to be transmitted is delivered to a data processing block 54, where it first passes through an interleaver and pre-coder 56. Interleaver and pre-coder 56 interleaves and pre-codes the stream of data 52, as is known in the art and sends the interleaved and pre-coded stream to serial to parallel converter 58. Converter 58, produces from the single data stream a number k of spatial-multiplexed streams $SM_i$, where i=1 . . . k and k is a variable, i.e., the number of streams $SM_i$ is variable, subject to the condition that $1 \leq k \leq N$ and also $k \leq M$. In other words, the maximum number k of streams $SM_i$ is limited by the smaller of the number M of transmit antennas $TA_1, TA_2, \ldots, TA_M$ and the number N of receive antennas $RA_1, RA_2, \ldots, RA_N$ (see FIG. 4).

The value of k is controlled by an adaptive controller 60, which is part of control unit 62 and is connected to serial to parallel converter 58. The decision on the number k of streams $SM_i$ can be made locally by adaptive controller 60 or it can be communicated from a receiver, as described below. In most systems, the decision relies on feedback 64 from receiver indicating a quality parameter or information from which adaptive controller 60 can derive the quality parameter. In other systems, for example Time Division Duplexed (TDD) system, where the channel is reciprocal, no extra feedback is necessary. In those cases the feedback is obtained from the transmit unit's own receive unit, as indicated in dashed lines.

Each of the k streams $SM_i$ passes through a corresponding Space-Time Coder 65 (S-T Coder) of an S-T Coding Unit 66. Each S-T Coder produces k' coded streams $CS_h$, where h=1 . . . k'. The number k' is at least 1 and at most M, depending on the number of streams $SM_i$ selected by adaptive controller 60. In fact, adaptive controller 60 is also connected to S-T Coding unit 66 to also control the number k'.

Space-time coding is a known technique which combines conventional channel coding and antenna diversity. S-T coding splits an encoded data stream, in this case each of spatial-multiplexed streams $SM_i$ into k' dependent data streams, in this case coded streams $CS_h$, each of which is modulated and simultaneously transmitted from a different transmit antenna TA. Various choices of mapping of data to transmit antennas $TA_1, TA_2, \ldots, TA_M$ can be used. All transmit antennas TA can use the same modulation format and carrier frequency. Alternatively, different modulation or symbol delay can be used. Other approaches include the use of different carrier frequencies (multi-carrier techniques) or spreading codes. The concept of S-T coding is further described in the literature (see, e.g., V. Tarokh et al., "Space-time codes for high data rate wireless communication: Performance criterion and code construction", IEEE Transactions on Information Theory, Vol. 44, No. 2, March 1998; and S. A. Alamouti, "A simple transmit diversity technique for wireless communications", IEEE Journal on selected areas in Communications, Vol. 16, pp. 1451-58, October 1998).

According to the method of the invention, each S-T code is imposed by corresponding S-T coder 65 and output in the form of k' streams $CS_h$. The constraint length of the code and value k' can be decided depending upon the computational complexity which can be afforded in the operation of the communication system. The coding rate and the modulation rate should be chosen depending upon the characteristics of the channel, i.e., depending on the communication parameter as reflected by the value of the quality parameter.

In the preferred embodiment a database 68 in control unit 62 contains the set of S-T codes to be used depending on the number k' and the quality parameter. Database 68 is connected to S-T Coding Unit 66 for supplying these S-T codes to the latter. Adaptive controller 60 is connected to database 68 to control the transfer of the S-T codes to S-T Coding Unit 66.

Each of the S-T codes stored in database 68 has an associated coding scheme and modulation scheme. The coding rate and modulation rate of the different S-T codes may be chosen to be different, such that each S-T code is suitable to given channel conditions, as indicated by the quality parameter. The choice of coding rates and modulation rates of the S-T codes can be further dictated by what communication parameter of the channel is to be optimized. Specifically, communication parameter such as data throughput requires that the S-T code with higher rate modulation and code be chosen.

Figure 8:
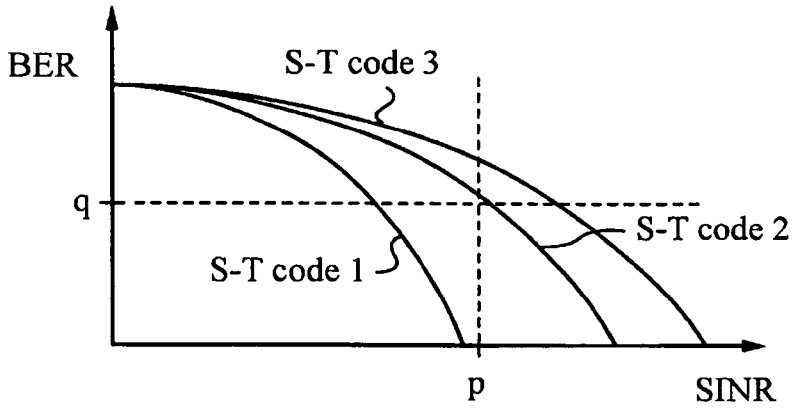
FIG. 8 illustrates performance curves for S-T code selection in accordance with the invention.

For example, if the quality parameter which is fed back is SINR and the aim is to improve the throughput, then database 68 will contain the performance curves (BER versus SINR) for different S-T codes for all possible transmit/receive configurations in terms of number M of transmit antennas $TA_1, TA_2, \ldots, TA_M$ and number N of receive antennas $RA_1, RA_2, \ldots, RA_N$. FIG. 8 shows the performance of three typical S-T codes. As can be seen, to achieve a BER of value q, which is suitable for the application (e.g., voice data transmission), when the prevailing average SINR has to have a value p or less, only S-T codes 1 and 2 are suitable. S-T code 3 is not suitable because at SINR value p its BER is too high. Now, when the communication parameter to be maximized is the throughput, an additional choice is to be made between S-T code 1 and S-T code 2, and the one maximizing throughput is selected. A person of average skill in the art will see that this process or a similar process can be employed to maximize any of the communication parameters. In addition, preferably, database 68 contains the necessary performance curves to select the proper S-T codes, values of k and G(z) matrix sets to use. However, empirically collected data may also be used.

In the preferred embodiment, k' is equal to the number M of transmit antennas $TA_1, TA_2, \ldots, TA_M$. Each S-T coder 65 uses the S-T code indicated by adaptive controller 60 and the codes used by individual S-T coders 65 can be the same or different. Alternatively, the k spatial-multiplexed streams $SM_i$ can also be S-T coded jointly to provide only one set of k' coded streams $CS_h$. Joint S-T coding typically incurs a higher computational complexity as opposed to separate S-T coding. Joint S-T coding is preferable if the computational complexity is acceptable. A person of average skill in the art will be able to make the appropriate design choice in any given case.

A transmit processing unit 72 receives coded streams $CS_h$ and produces M transmit signals $TS_1, TS_2, \ldots, TS_M$ for transmission. An Up-conversion and RF Amplification unit 74, as is well-known in the art, receives the M transmit signals $TS_p$, prepares them as necessary, and transmits them from antennas TA.

The conversion of coded streams $CS_h$ is performed by the application of k M×M space-time (or alternatively space-frequency) filtering matrix set G(z) to all inputs (M=k'). The choice of matrix set G(z) is based on the quality parameter. For this reason adaptive controller 60 is connected to unit 72 to adaptively control the selection of matrix set G(z).

Preferably, database 68 is also connected to unit 72 and contains stored parameters of suitable matrix sets G(z) for any given channel conditions or the matrix sets G(z) themselves. In the latter case adaptive controller 60, which is also connected to database 68, instructs database 68 to download the appropriate matrix set G(z) into transmit processing unit 72 as the channel conditions change. The choice of matrix set G(z) is made to facilitate the salability of the k spatial-multiplexed streams $SM_i$ at the receiver. Matrix set G(z) can incorporate diversity techniques such as delay/switched diversity or any other combining techniques known in the art. For example, when no channel information is available at transmit unit 50, e.g., at system initialization or at any other time, then matrix set G(z) (which consists of k M×M matrices) is made up of k matrices of rank M*k such that the subspaces spanned by thee matrices are mutually orthogonal to ensure separability of k stems at receive unit 80. The task of finding such matrices can be performed by a person of average skill in the art. During operation, as the quality parameter changes, other sets of matrices G(z) can be also used.

It is important to note, that S-T Coding Unit 66 and transmit processing unit 72 together operate on the k spatial-multiplexed streams $SM_i$ to map them into transmit signals $TS_p$, where p=1 . . . M, which are assigned to the corresponding transmit antennas $TA_1, TA_2, \ldots, TA_M$. In other words, S-T Coding Unit 66 in conjunction with transmit processing unit 72 form an antenna mapping unit which maps streams $SM_i$ to transmit antennas $TA_1, TA_2, \ldots, TA_M$ in accordance with the above-described rules. The mapping is adjusted by adaptive controller 60 with the aid of S-T codes and matrices G(z)

stored in database 68 as a function of the quality parameter indicative of the channel conditions.

Transmit unit 50 preferably also has a training unit 70 drawn in dashed lines to include training data, as is known in the art. The training data can be inserted at any appropriate location before or after S-T Coding Unit 66 and delivered to transmit processing unit 72. The training data can be sent in a separate control channel or together with data 52. A person of average skill in the art will be familiar with the necessary techniques and requirements.

Figure 4:
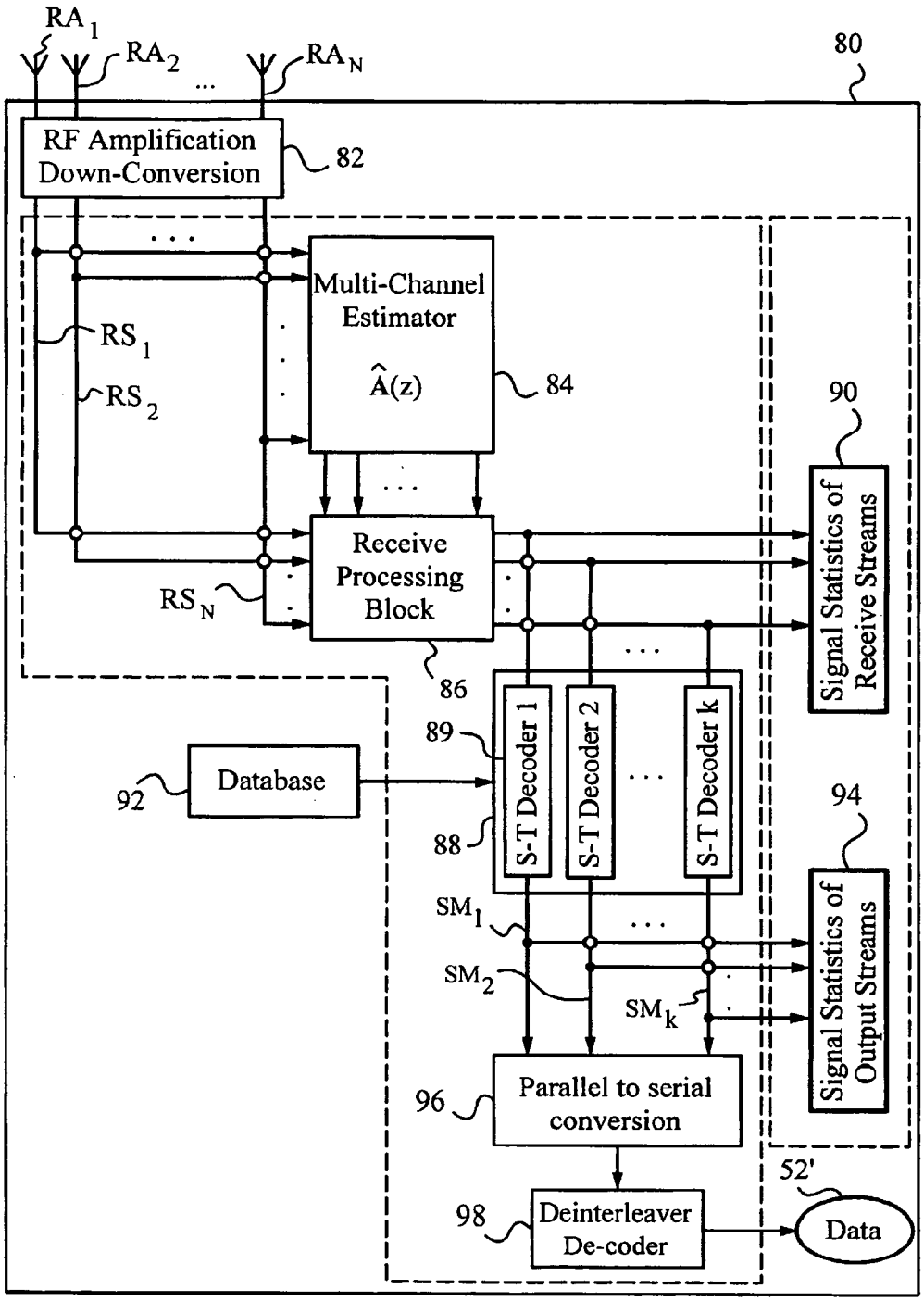
FIG. 4 is a block diagram of an exemplary receive unit in accordance with the invention.

FIG. 4 shows the block diagram of a corresponding receiver 80 for receiving signals transmitted from transmit unit 50. Specifically, receiver 80 has an array of N receive antennas $RA_1, RA_2, \ldots, RA_N$ to receive $RS_j$ receive signals, where j=1 . . . N. An RF amplification and down-conversion block 82 amplifies and converts signals $RS_j$ and performs any other required operations (e.g., sampling, analog-to-digital conversion). Then, signals $RS_j$ are passed on to both a matrix channel estimator 84 and a receive processing unit 86.

Matrix channel estimator 84 estimates the channel coefficients using known training patterns, e.g., the training patterns provided by training unit 70 in accordance with known techniques. In the present case, the output of estimator 84 is $\hat{A}(z)$:

$$\hat{A}(z)=G(z)H(z),$$

where G(z) is the matrix applied by transmit processing block 72, and H(z) is the matrix of pure channel coefficients. G(z) is a set of M×M matrices while H(z) is an M×N matrix. The resulting matrix $\hat{A}(z)$ is an M×N matrix and represents channel estimates for received signals $RS_1, RS_2, \ldots, RS_N$ after digitization. The channel estimates supplied to receive processing block 86 by estimator 84 are used by the latter to recover the k spatial-multiplexed streams $SM_i$. In fact, any of the well-known receive processing techniques such as zero-forcing (ZF), MMSE, LS, ML etc. can be used for processing received signals $RS_1, RS_2, \ldots, RS_N$.

The recovered k coded streams are supplied to both an S-T Decoding Unit 88 and to a signal statistics of receive streams unit 90. S-T Decoding Unit 88 has S-T decoders 89 which reverse the coding of S-T coders 65 of transmit unit 50. The S-T codes to be applied are supplied to unit 88 by a database 92. S-T decoding will be discussed in more detail below in reference to FIG. 5. Signal statistics unit 90 analyzes receive signals $RS_j$ converted to k streams by receive processing block 86 to assess the quality parameter. In the preferred embodiment, unit 90 is an averaging unit which averages signal statistics over time. Unit 90 computes the signal statistics of each of the k streams including signal-to-interference noise ratio (SINR), signal-to-noise ratio (SNR), power level, level crossing rate (LCR), level crossing duration at a given signal threshold and reception threshold or other signal parameters.

For example, when receive processing is performed with the ZF (zero-forcing) method, unit 90 computes SINR in accordance with the following algorithm:

$$\mathrm{SINR} = \left\langle \left\| \hat{A}^{-1} * Y - X \right\|^2 \right\rangle,$$

where the brackets denotes the expectation value, X is the transmitted sequence and Y is the received sequence. LCR is the rate at which the signal level goes below a set level. LCR can be computed for different signal level thresholds. SINR and LCR both give an indication of the error properties of the channel. The window size (duration) over which these statistics are computed and averaged by unit 90 can be changed depending upon the kind of channel receive unit 80 sees.

For a given threshold level and LCR the error probability will depend upon the type of S-T codes used (which includes the coding and modulation aspects of the S-T codes) and the number k of spatial-multiplexed streams $SM_i$ used by transmit unit 50. The value of k is dictated by the separability of spatial signatures at receive unit 50.

Thus, the choice of S-T codes for k separable spatial-multiplexed streams $SM_i$ can be based on the LCR and LC duration at a given threshold level and a maximum acceptable error rate. Average SINR can also give similar kind of information. This error information is used directly by unit 90 as the quality parameter or is used to derive the quality parameter. The other signal criteria can be used in a similar fashion to be employed by unit 90 directly as the quality parameter or to derive a quality parameter.

Alternatively, and preferably in addition to unit 90 a signal statistics of output streams unit 94 is used to analyze reconstructed streams $SM_i$ obtained from S-T Decoding Unit 88. Once again, unit 94 can perform the same statistical computations of reconstructed streams $SM_i$ to obtain signal statistics including signal-to-interference noise ratio (SINR), signal-to-noise ratio (SNR), power level, level crossing rate (LCR), level crossing duration and reception threshold or other signal parameters. Meanwhile, reconstructed streams $SM_i$ are converted to a serial stream by parallel to serial converter 96. Then, they are de-interleaved and decoded by de-interleaver and decoder 98 to recover data 52' (the prime indicates that the recovered data may differ from original data 52 due to transmission errors) originally transmitted from transmit unit 50.

The method of the invention employs the quality parameter or parameters obtained as described above to adjust at least the number k of spatial-multiplexed streams $SM_i$ generated by serial to parallel converter 58 of transmit unit 50. Preferably, the quality parameter or parameters are also used to control the S-T coding of unit 66, e.g., the selection of number k', and transmit processing, i.e., the selection of matrix set G(z) of transmit processing unit 72 of transmit unit 50.

During regular operation, transmit unit 50 selects G(z), k, k' and S-T codes at system initialization. These parameters are then updated as the channel changes. Transmit unit 50 sends control information 102 (see FIG. 5A), including the S-T codes used, the value k, the matrix set G(z) being applied by transmit processing unit 72 etc. regularly to receive unit 80. Alternatively, this information may be transmitted only once during initialization of a communication session and then updated as required (e.g., only when one of these pieces of information changes).

Figure 5A:
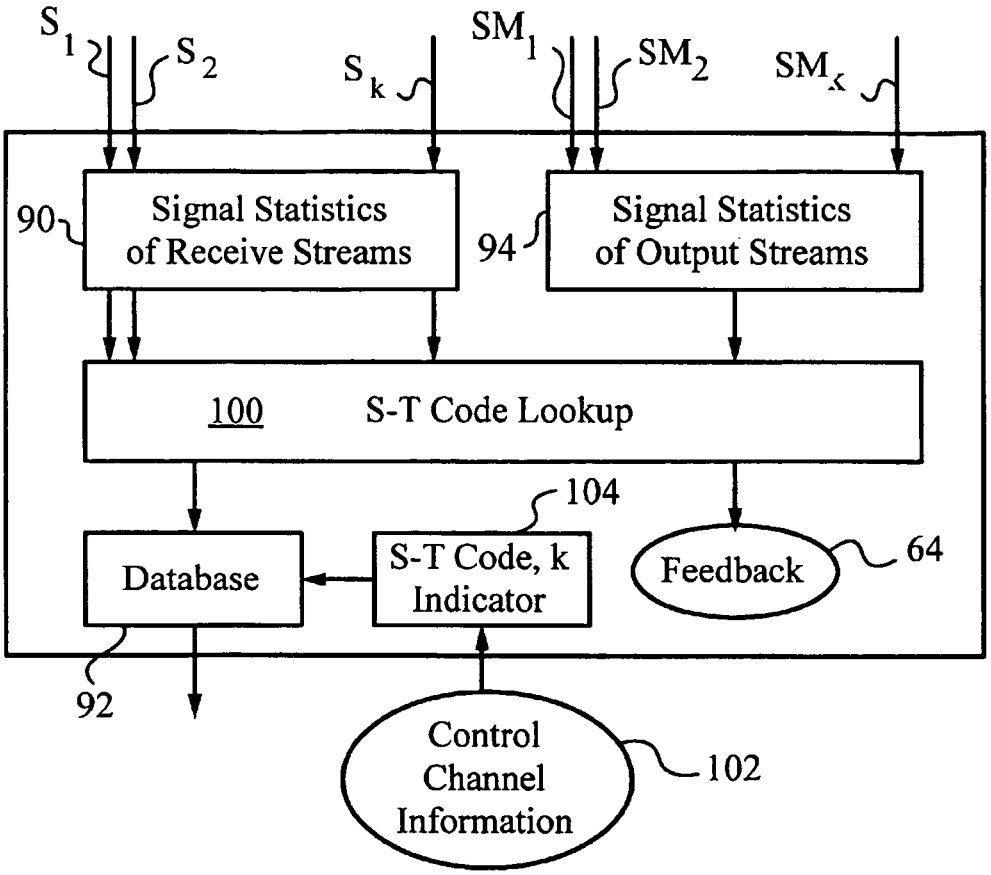
FIG. 5A is a block diagram illustrating the operation of the statistical units for deriving the quality parameter.

FIG. 5A illustrates in more detail how adaptive control of G(z), k, k' and S-T codes is accomplished. Streams $S_1$ through $S_k$ are supplied to unit 90 while reconstructed spatial-multiplexed streams $SM_1$ through $SM_k$ are supplied to unit 94. Both units 90, 94 compute the signal statistics as described above. Then, units 90, 94 communicate their signal statistics or quality parameters to an S-T Code Lookup block 100. Based on these block 100 makes a decision on the most suitable S-T code and value of k to be used. This decision is passed on as feedback 64 to transmitter 50. Alternatively, block 100 passes on the signal statistics as feedback 64 to adaptive control 60 of transmit unit 50. In this case, adaptive control 60 selects the appropriate S-T codes and k value. The decisions on the use of appropriate matrix set G(z) is also made by adaptive control 60 based on feedback 64.

Of course, in order to recover data 52, receiver 80 has to use the appropriate S-T codes and know the number k. This information is available to it either from block 100, which can supply this information to database 92 of S-T codes which is connected to S-T Decoding Unit 88 (see FIG. 4) or from control channel information 102 transmitted by transmit unit 50, as mentioned above. In case control channel information 102 is used, an S-T code, k indicator 104 receives the information and communicates it to database 92. During system start-up indicator 104 can either start with the last used configuration or start with value k=1 and a particular S-T code and G(z) matrix set. Alternatively, it can start with any agreed upon configuration. Of course, the configuration will be updated during the session to maximize a communication parameter.

The adjustment of k, S-T codes and selection of matrix set G(z), whether suggested by block 100 or determined by adaptive control 60, is made to maximize or optimize a communication parameter under the changing channel conditions. Typically, the communication parameter to be maximized is either the channel capacity, signal quality, SNR or throughput. Channel capacity will be maximized by selecting the largest possible value of k and a high throughput S-T code (high modulation rate and low coding overhead). The reduction of k increases the order of diversity. In this case, the signal quality improves but throughput decreases. The SNR will be maximized if k=1, but this, will minimize the channel capacity. Hence adaptive control 60 (or block 100) has to decide an optimum k if both channel capacity and signal quality are to be maximized.

In addition, in case the method of the invention is implemented in a system with frequency re-use, e.g., a cellular network with frequency re-use, the receive unit is likely to see interference. In addition, the method of invention is preferably implemented in conjunction with interference mitigation, as is known in the art. In that case, the choice of S-T codes, the number k and matrix set G(z) should be done in such a way that interference mitigation is also carried out side by side. When the method of the invention is implemented with interference mitigation some reduction of order of diversity or spatial multiplexing may occur.

In an alternative embodiment, S-T Decoding Unit 88 can be a joint S-T decoder for producing k reconstructed streams $SM_i$ rather than the group of S-T decoders 89 as shown in FIG. 4. Joint or separate decoding strategy depends upon the coding strategy employed by transmit unit 50 and can be reconfigured.

In alternative embodiments different types of coders can replace the S-T coders. For example, the decoding unit can be a space-frequency coder, and adaptive modulation rate coder or other suitable coding device. The space-time and space-frequency coders can use different coding and modulation rates.

Figure 5B:
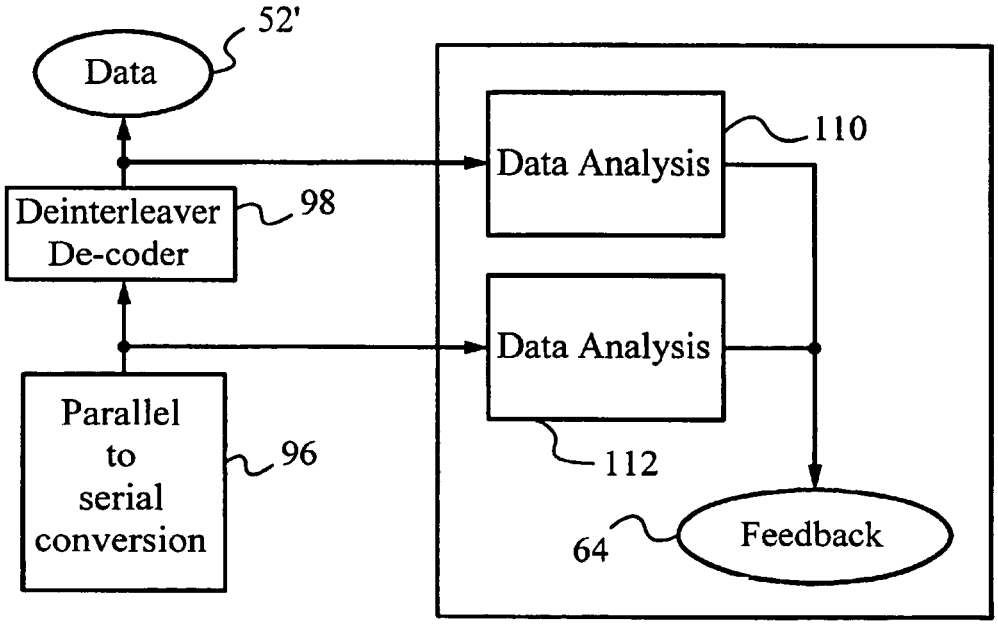
FIG. 5B is a block diagram illustrating the operation of alternative data analysis blocks for deriving a quality parameter from reconstituted data.

In yet another embodiment, as shown in FIG. 5B, receive unit 80 can take advantage of additional data analysis blocks 110 and 112 to compute additional data statistics after parallel to serial conversion and after the de-interleaving and final de-coding steps. These data statistics could be BER or packet error rate. This information can also be fed back to transmit unit 50 to adjust the parameters k, k', S-T coding and selection of matrix set G(z). Alternatively, this information can be sent to unit 100 for local determination of the parameters.

Figure 6:
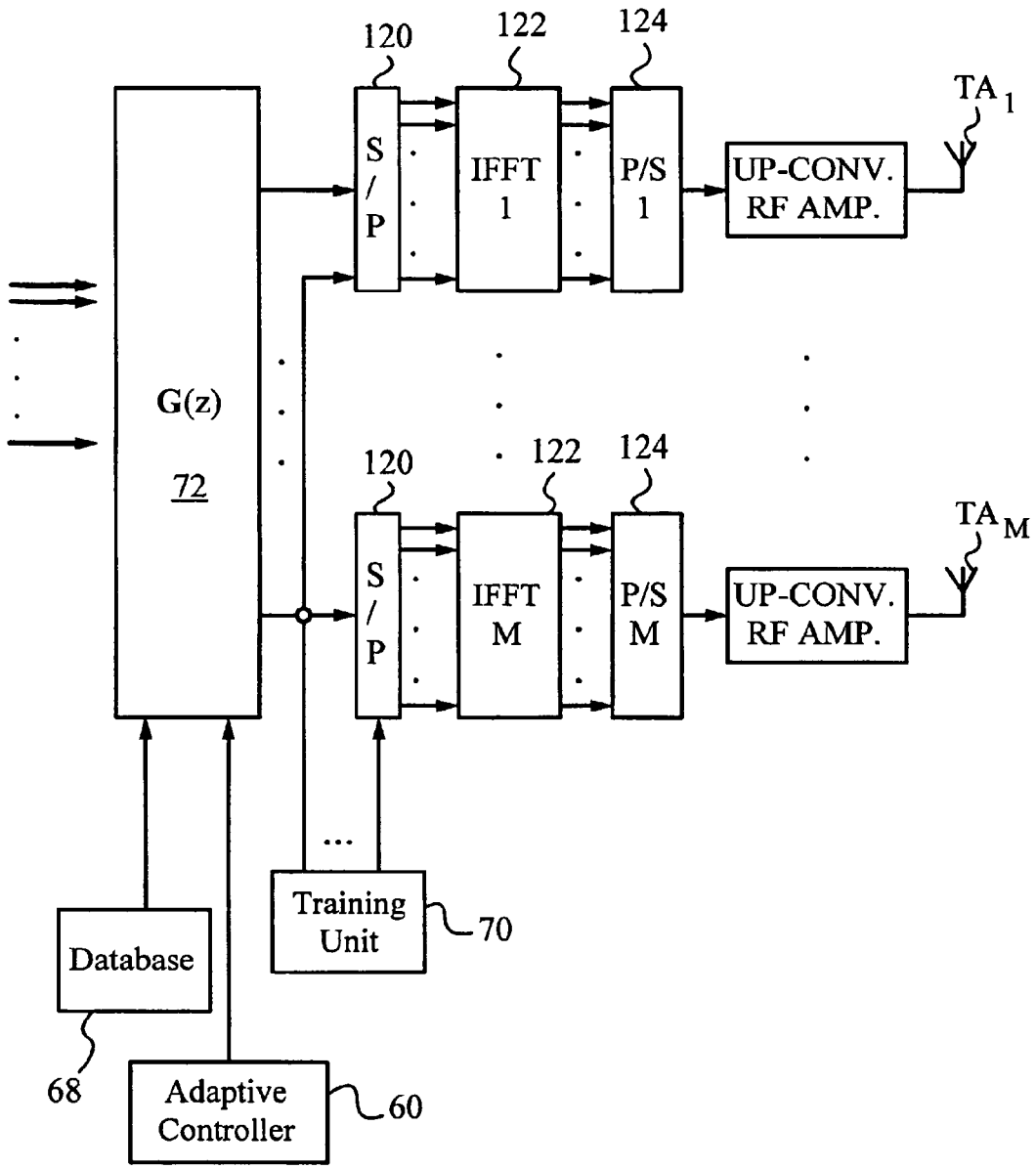
FIG. 6 is a block diagram of a portion of another embodiment of transmit unit in accordance with the invention.
Figure 7:
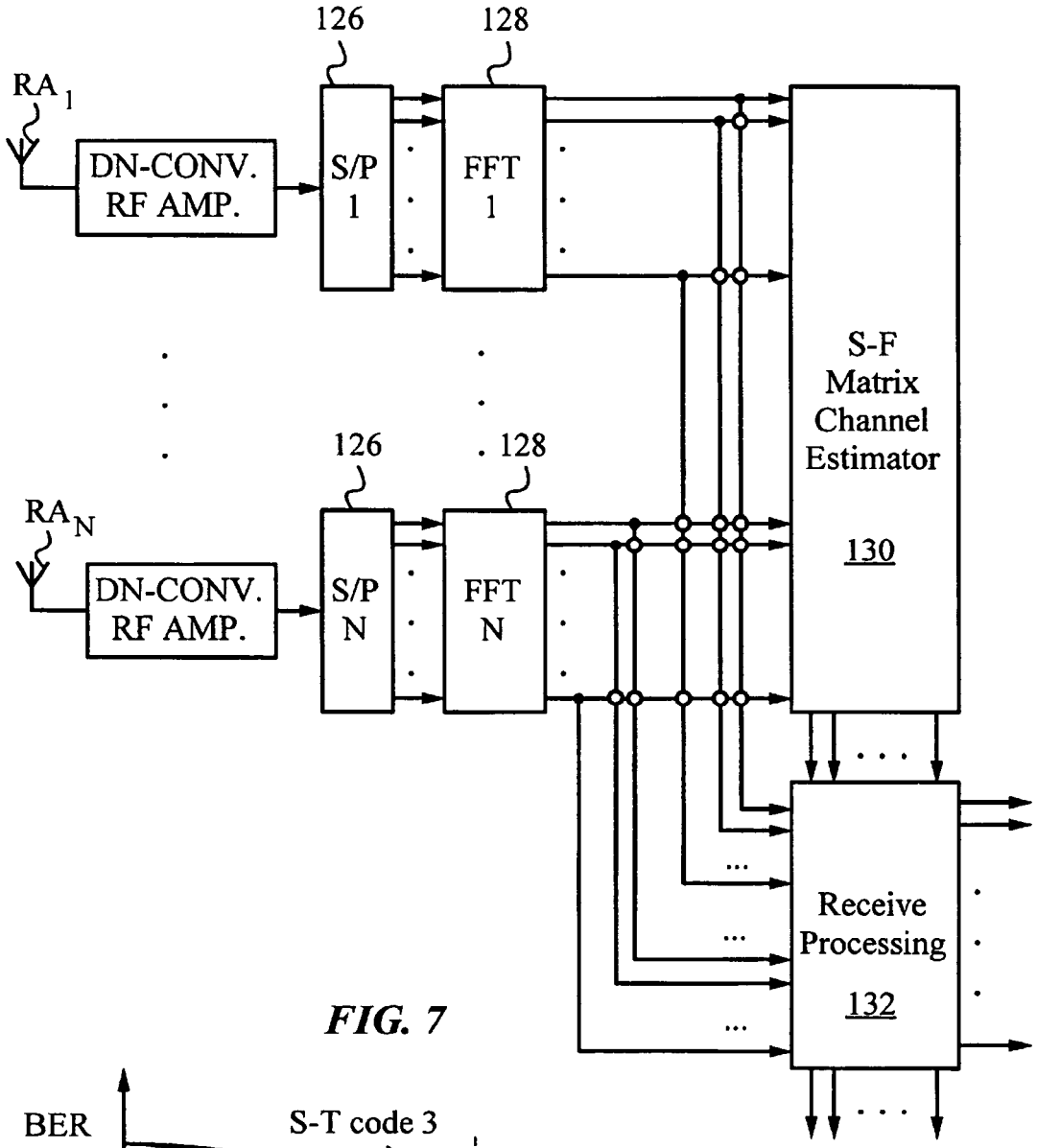
FIG. 7 is a block diagram of a portion of a receive unit for receiving receive signals $RS_j$ from the transmit unit of FIG. 6.

The system can be based on any multiple access technique including TDMA, FDMA, CDMA and OFDMA. For example, the adaptations necessary to transmit unit 50 and receive unit 80 for implementation in an OFDM system are illustrated in FIGS. 6 and 7. Specifically, FIG. 6 illustrates the adaptation of transmit unit 50 to operate in an OFDM system. In this case transmit signals from transmit processing unit 72 have to be converted to parallel by serial-to-parallel converters (S/P) 120. In this case, training unit 70 also provides the training patterns directly to S/P converters 120 in this case. Next, the parallel transmit signals are inverse fast Fourier transformed by IFFT's 122 and again transformed to serial by parallel-to-serial converters (P/S) 124. Then, the signals are up-converted and amplified for RF transmission from transmit antennas $TA_1, \ldots, TA_M$.

FIG. 7 illustrates the adaptation to receive unit 80 necessary to receive OFDM signals as transmitted for transmit unit 50 adapted as shown in FIG. 6. Specifically, receive signals are received by receive antennas $RA_1, \ldots,$ RAN and the down-converted and amplified by the corresponding blocks. Then, the signals are converted from serial to parallel by S/P converters 126. Fast Fourier transform (FFT) blocks 128 1 through N then transform the signals and pass them on to both a space-frequency (S-F) matrix channel estimator 130 and to the receive processing block 132. From there, the processing of the receive signals proceeds as in receive unit 80.

It will be clear to one skilled in the art that the above embodiment may be altered in many ways without departing from the scope of the invention. Accordingly, the scope of the invention should be determined by the following claims and their legal equivalents.

What is claimed is:

1. A method of maximizing a communication parameter of a channel between a transmit unit having a number M of transmit antennas and a receive unit having a number N of receive antennas, said method comprising the following steps:

a) processing [said] data to produce parallel spatial-multiplexed streams $SM_i$, where i=1 . . . k;

b) mapping said spatial-multiplexed streams $SM_i$ to transmit signals $TS_p$, where p=1 . . . M, for transmission from said M transmit antennas to said receiver via said channel, wherein the mapping comprises processing each of said spatial-multiplexed streams $SM_i$ by a coding unit to produce coded streams $CS_h$, where h=1 . . . k';

c) receiving receive signals $RS_j$, where j=1 . . . N by said N receive antennas;

d) assessing a quality parameter of said receive signals $RS_j$;

e) using said quality parameter to adjust k to maximize said communication parameter of said channel; and f) using said quality parameter in said transmit unit to adjust k'.

2. The method of claim 1, wherein said quality parameter is utilized in said transmit unit to adjust the coding of said coding unit.

3. The method of claim 1, wherein said coding unit is selected from the group consisting of space-time coders, space-frequency coders, adaptive modulation rate coders.

4. The method of claim 3, wherein said space-time coders and said space-frequency coders use different coding and modulation rates.

5. The method of claim 1, further comprising the step of receive processing said receive signals $RS_j$ to reproduce said spatial-multiplexed streams $SM_i$.

6. The method of claim 5, wherein said quality parameter is obtained from said receive processed spatial-multiplexed streams $SM_i$.

7. The method of claim 6, wherein said quality parameter is derived by a statistical unit.

8. The method of claim 6, wherein said quality parameter is selected from the group consisting of signal-to-interference noise ratio, signal-to-noise ratio, power level, level crossing rate, level crossing duration.

9. The method of claim 1, further comprising the steps of processing said receive signals $RS_j$ to reconstitute said data and obtaining said quality parameter from said data.

10. The method of claim 9, wherein said quality parameter is selected from the group consisting of bit-error-rate and packet error-rate.

11. The method of claim 1, wherein said mapping step further comprises a transmit processing step by a transmit processing block and said quality parameter is used for adjusting the transmit processing of said transmit processing block.

12. The method of claim 1, wherein said quality parameter is fed back to said transmit unit.

13. The method of claim 1, wherein said step of processing said data comprises a technique selected from the group consisting of adaptive modulation, adaptive coding, Space-Time coding, and Space-Frequency coding.

14. The method of claim 1, wherein said transmit signals $TS_p$ are formatted in accordance with at least one multiple access technique selected from the group consisting of TDMA, FDMA, CDMA, OFDMA.

15. The method of claim 1, wherein said communication parameter is selected from the group consisting of data capacity, signal quality and throughput.

16. The method of claim 1, wherein said receive unit and said transmit unit belong to a cellular communication system.

17. The method of claim 16, used in the downlink of said cellular communication system.

18. The method of claim 16, used in the uplink of said cellular communication system.

19. A communication system with an adaptively maximized communication parameter of a channel in which data is transmitted between a transmit unit having a number M of transmit antennas and a receive unit having a number N of receive antennas, said transmit unit comprising:

a) processing means for processing said data to produce parallel spatial-multiplexed streams $SM_i$, where i=1 . . . k;

b) antenna mapping means for converting said spatial-multiplexed streams $SM_i$ to transmit signals $TS_p$, where p=1 . . . M, and transmitting said transmit signals $TS_p$ from said M transmit antennas via said channel;

said receive unit receiving receive signals $RS_j$, where j=1 . . . N, and said communication system comprising:

a) means for assessing a quality parameter of said receive signals $RS_j$;

b) means for adjusting k based on said quality parameter to maximize said communication parameter of said channel; and c) an adaptive controller in communication with said processing means and said antenna mapping means, said adaptive controller adjusting said processing means and said antenna mapping means based on said quality parameter.

20. The communication system of claim 19, wherein said means for assessing said quality parameter comprises a statistical unit.

21. The communication system of claim 19, wherein said means for assessing said quality parameter is located in said receive unit.

22. The communication system of claim 19, wherein said means for assessing said quality parameter is located in said transmit unit.

23. The communication system of claim 19, further comprising a coding unit in said transmit unit for processing said spatial-multiplexed streams $SM_i$ to produce coded streams $CS_h$, where h=1 . . . k'.

24. The communication system of claim 23, wherein said means for adjusting k further comprises a mechanism for adjusting k'.

25. The communication system of claim 23, wherein said coding unit is selected from the group consisting of space-time coders, space-frequency coders, adaptive modulation rate coders.

26. The communication system of claim 23, further comprising a database of codes and antenna mapping parameters in communication with said coding unit and said antenna mapping means.

27. The communication system of claim 23, further comprising an adaptive controller in communication with said processing means, said coding unit and said antenna mapping means, said adaptive controller adjusting said processing means, said coding unit and said antenna mapping means based on said quality parameter.

28. The communication system of claim 19, wherein said means for adjusting k is located in said transmit unit.

29. The communication system of claim 19, said communication system operating in accordance with at least one multiple access technique selected from the group consisting of TDMA, FDMA, CDMA, OFDMA.

30. The communication system of claim 19, wherein said communication system is a cellular communication system.

31. The communication system of claim 19 employing multi-carrier modulation.

*32. A method of improving a communication parameter of a wireless communication channel between a transmit unit having a number M of transmit antennas and a receive unit having a number N of receive antennas, said method comprising:*

*processing data to produce parallel spatial-multiplexed streams;*

*mapping said spatial-multiplexed streams to transmit signal(s) for transmission from one or more of said M transmit antennas to the receiver via the wireless communication channel, wherein the mapping comprises processing at least a subset of the spatial multiplexed streams to produce a plurality of coded streams; and*

*receiving an indication from a receiver denoting one or more quality parameters associated with the wireless communication channel; and*

*modifying one or more of the number of parallel spatial-multiplexed streams and the mapping of said spatial multiplexed streams to transmit signals based, at least in part, on the received indication;*

*wherein the quality parameter is utilized in the transmit unit to adjust one or more coding parameters employed by a coding unit in generating the plurality of coded streams.*

*33. A method according to claim 32, wherein the transmit signals are formatted in accordance with at least one multiple access technique selected from a group consisting of TDMA, FDMA, CDMA, and OFDM.*

*34. A method according to claim 32, wherein the indication is received from a remote receiver.*

*35. A method according to claim 32, wherein the indication is received from a receiver co-located with the transmit unit.*

*36. A method of improving a communication parameter of a wireless communication channel between a transmit unit having a number M of transmit antennas and a receive unit having a number N of receive antennas, said method comprising:*

*processing data to produce parallel spatial-multiplexed streams;*

*mapping said spatial-multiplexed streams to transmit signal(s) for transmission from one or more of said M transmit antennas to the receiver via the wireless communication channel, wherein the mapping comprises processing at least a subset of the spatial multiplexed streams to produce a plurality of coded streams; and*

*receiving an indication from a receiver denoting one or more quality parameters associated with the wireless communication channel; and*

*modifying one or more of the number of parallel spatial-multiplexed streams and the mapping of said spatial multiplexed streams to transmit signals based, at least in part, on the received indication, wherein a coding unit is selected from a group consisting of space-time coders, space-frequency coders, adaptive modulation rate coders.*

*37. A method of improving a communication parameter of a wireless communication channel between a transmit unit having a number M of transmit antennas and a receive unit having a number N of receive antennas, said method comprising:*

*processing data to produce parallel spatial-multiplexed streams;*

*mapping said spatial-multiplexed streams to transmit signal(s) for transmission from one or more of said M transmit antennas to the receiver via the wireless communication channel, wherein the mapping comprises processing at least a subset of the spatial multiplexed streams to produce a plurality of coded streams; and*

*receiving an indication from a receiver denoting one or more quality parameters associated with the wireless communication channel, wherein the indication denotes one or more of a bit-error rate (BER), packet error rate (PER), signal to noise ratio (SNR), signal to interference and noise ratio (SINR), and a received signal strength indication (RSSI) measured at the receiver of the communication channel; and*

*modifying one or more of the number of parallel spatial-multiplexed streams and the mapping of said spatial multiplexed streams to transmit signals based, at least in part, on the received indication.*

*38. A method of improving a communication parameter of a wireless communication channel between a transmit unit having a number M of transmit antennas and a receive unit having a number N of receive antennas, said method comprising:*

*processing data to produce parallel spatial-multiplexed streams;*

*mapping said spatial-multiplexed streams to transmit signal(s) for transmission from one or more of said M transmit antennas to the receiver via the wireless communication channel, wherein the mapping comprises processing at least a subset of the spatial multiplexed streams to produce a plurality of coded streams; and*

*receiving an indication from a receiver denoting one or more quality parameters associated with the wireless communication channel; and*

*modifying one or more of the number of parallel spatial-multiplexed streams and the mapping of said spatial multiplexed streams to transmit signals based, at least in part, on the received indication, wherein the coding of the spatial-multiplexed streams comprises a technique selected from a group consisting of adaptive modulation, adaptive coding, space-time coding, and space-frequency coding.*

*39. A transmitter comprising:*

*a mapping unit, to selectively process a plurality (k) of spatial-multiplexed streams to produce a plurality (k') of coded spatial-multiplexed streams, and to map at least a subset of the plurality (k') of coded spatial-multiplexed streams to a plurality of (M) of transmit antennae for transmission to a remote receiver via a wireless communication channel; and*

*a control unit, coupled to the mapping unit, to control one or more aspects of one or more of the selective processing spatial-multiplexed streams and the mapping of the coded spatial-multiplexed streams based, at least in part, on an indication of a quality parameter associated with the wireless communication channel;*

*wherein the quality parameter is utilized in the transmitter to adjust one or more coding parameters employed by a coding unit in generating the plurality of coded streams.*

*40. A transmitter according to claim 39, the mapping unit comprising:*

*a coding unit, to receive the plurality (k) of spatial-multiplexed streams and to generate the plurality (k') of coded spatial-multiplexed streams.*

*41. A transmitter according to claim 40, wherein the coding unit comprises a number (k) of space-time coders.*

*42. A transmitter according to claim 40, wherein the coding unit comprises a number (k) of space-frequency coders.*

*43. A transmitter according to claim 40, the mapping unit further comprising:*

*a transmit processing unit, to receive the plurality (k') of coded spatial-multiplexed streams to select ones of at least a subset of a plurality (M) of transmit antennae.*

*44. A transmitter according to claim 39, wherein the indication of the quality parameter is received from a remote receiver.*

*45. A transmitter according to claim 39, wherein the indication of the quality parameter associated with the wireless communication channel is received from a co-located receive unit.*

*46. A transceiver comprising:*

*a plurality of dipole antennae; and*

*a transmitter according to claim 40, coupled with at least a subset of the plurality of dipole antennae through which a wireless communication channel may be established with a remote receiver, wherein the transmitter adaptively modifies one or more of a number of spatial-multiplexed streams, the coding applied to the spatial-multiplexed streams, and/or the mapping of the coded spatial-multiplexed streams to the plurality of dipole antennae.*

*47. A transmitter comprising:*

*a mapping unit comprising a coding unit, to receive a plurality (k) of spatial-multiplexed streams and to generate a plurality (k') of coded spatial-multiplexed streams, to selectively process a plurality (k) of spatial-multiplexed streams to produce a plurality (k') of coded spatial-multiplexed streams, and to map at least a subset of the plurality (k') of coded spatial-multiplexed streams to a plurality of (M) of transmit antennae for transmission to a remote receiver via a wireless communication channel, the coding unit comprising a number (k) of space time coders and at least a subset of the k space-time coders applies one of a number of space-time codes to an associated subset of the received k spatial-multiplexed streams based, at least in part, on a control signal generated by a control unit in view of the received indication; and*

*a control unit, coupled to the mapping unit, to control one or more aspects of one or more of the selective processing spatial-multiplexed streams and the mapping of the coded spatial-multiplexed streams based, at least in part, on an indication of a quality parameter associated with the wireless communication channel.*

*48. A transmitter comprising:*

*a mapping unit comprising a coding unit, to receive a plurality (k) of spatial-multiplexed streams and to generate a plurality (k') of coded spatial-multiplexed streams, to selectively process a plurality (k) of spatial-multiplexed streams to produce a plurality (k') of coded spatial-multiplexed streams, and to map at least a subset of the plurality (k') of coded spatial-multiplexed streams to a plurality of (M) of transmit antennae for transmission to a remote receiver via a wireless communication channel, the coding unit comprising a number (k) of space time coders and at least a subset of the k space-time coders applies one of a number of space-time codes to an associated subset of the received k spatial-multiplexed streams based, at least in part, on a control signal generated by a control unit in view of the received indication and the space-time code selected is designed to improve the quality parameter associated with the wireless communication channel; and*

*the control unit, coupled to the mapping unit, to control one or more aspects of one or more of the selective processing spatial-multiplexed streams and the mapping of the coded spatial-multiplexed streams based, at least in part, on an indication of a quality parameter associated with the wireless communication channel.*

*49. A transmitter comprising:*

*a mapping unit comprising a coding unit and a transmit processing unit, the coding unit to receive the plurality (k) of spatial-multiplexed streams and to generate the plurality (k') of coded spatial-multiplexed streams, to selectively process a plurality (k) of spatial-multiplexed streams to produce a plurality (k') of coded spatial-multiplexed streams, and to map at least a subset of the plurality (k') of coded spatial-multiplexed streams to a plurality of (M) of transmit antennae for transmission to a remote receiver via a wireless communication channel and the transmit processing unit to receive the plurality (k') of coded spatial-multiplexed streams to select one of at least a subset of a plurality (M) of transmit antennae and applies a select one of a number of k M×M space-time filtering matrix set G(z) to the received k' coded spatial-multiplexed streams; and*

*a control unit, coupled to the mapping unit, to control one or more aspects of one or more of the selective processing spatial-multiplexed streams and the mapping of the coded spatial-multiplexed streams based, at least in part, on an indication of a quality parameter associated with the wireless communication channel.*

*50. A transmitter comprising:*

*a mapping unit comprising a coding unit and a transmit processing unit, the coding unit to receive the plurality (k) of spatial-multiplexed streams and to generate the plurality (k') of coded spatial-multiplexed streams, to selectively process a plurality (k) of spatial-multiplexed streams to produce a plurality (k') of coded spatial-multiplexed streams, and to map at least a subset of the plurality (k') of coded spatial-multiplexed streams to a plurality of (M) of transmit antennae for transmission to a remote receiver via a wireless communication channel and the transmit processing unit to receive the plurality (k') of coded spatial-multiplexed streams to select one of at least a subset of a plurality (M) of transmit antennae and applies a select one of a number of k M×M space-time filtering matrix set G(z) to the received k' coded spatial-multiplexed streams; and*

*a control unit, coupled to the mapping unit, to control one or more aspects of one or more of the selective processing spatial-multiplexed streams and the mapping of the coded spatial-multiplexed streams based, at least in part, on an indication of a quality parameter associated with the wireless communication channel, the selection of the space-time filtering matrix set is made in response to control input from the control unit based, at least in part, on the received indication.*

*51. A transmitter comprising:*

*a mapping unit comprising a coding unit and a transmit processing unit, the coding unit to receive the plurality (k) of spatial-multiplexed streams and to generate the plurality (k') of coded spatial-multiplexed streams, to selectively process a plurality (k) of spatial-multiplexed streams to produce a plurality (k') of coded spatial-multiplexed streams, and to map at least a subset of the plurality (k') of coded spatial-multiplexed streams to a plurality of (M) of transmit antennae for transmission to a remote receiver via a wireless communication channel and the transmit processing unit to receive the plurality (k') of coded spatial-multiplexed streams to select one of at least a subset of a plurality (M) of transmit antennae and; and*

*a control unit, coupled to the mapping unit, to control one or more aspects of one or more of the selective processing spatial-multiplexed streams and the mapping of the coded spatial-multiplexed streams based, at least in part, on an indication of a quality parameter associated with the wireless communication channel, the transmit processing unit applies a select one of a number of k M×M space-frequency filtering matrix set to the received k' coded spatial-multiplexed streams in response to control input from the control unit based, at least in part, on the received indication.*

*52. A wireless communication device comprising:*

*a plurality of dipole antennae, wherein the wireless communication device establishes a wireless communication channel with one or more remote wireless communication devices through at least a subset of such antennae; and*

*a transmit unit, coupled with at least a subset of the dipole antennae, to selectively process a plurality (k) of spatial-multiplexed streams to produce a plurality (k') of coded spatial-multiplexed streams, and to map at least a subset of the plurality (k') of coded spatial-multiplexed streams to a plurality of (M) of the antennae for transmission to the remote receiver via the wireless communication channel, and to control one or more aspects of one or more of the selective processing spatial-multiplexed streams and the mapping of the coded spatial-multiplexed streams based, at least in part, on a received indication of a quality parameter associated with the wireless communication channel;*

*wherein the quality parameter is utilized in the transmit unit to adjust one or more coding parameters employed by a coding unit in generating the plurality of coded streams.*

*53. A wireless communication device according to claim 52, further comprising:*

*a receive unit, coupled with the transmit unit, to provide the indication of a quality parameter associated with the wireless communication channel.*

*54. A wireless communication device according to claim 52, wherein the indication of the quality parameter associated with the wireless communication channel is received from a remote receive unit.*

*55. A wireless communication device according to claim 54, wherein the remote receive unit is an intended target of the wireless communication channel.*

*56. A wireless communication device comprising:*

*a plurality of dipole antennae, wherein the wireless communication device establishes a wireless communication channel with one or more remote wireless communication devices through at least a subset of such antennae;*

*a transmit unit, coupled with at least a subset of the dipole antennae, to selectively process a plurality (k) of spatial-multiplexed streams to produce a plurality (k') of coded spatial-multiplexed streams, and to map at least a subset of the plurality (k') of coded spatial-multiplexed streams to a plurality of (M) of the antennae for transmission to the remote receiver via the wireless communication channel, and to control one or more aspects of one or more of the selective processing spatial-multiplexed streams and the mapping of the coded spatial-multiplexed streams based, at least in part, on a received indication of a quality parameter associated with the wireless communication channel;*

*a receive unit, coupled with the transmit unit, to provide the indication of a quality parameter associated with the wireless communication channel, the quality parameter represents one or more of a received signal strength indication (RSSI), a crossing level, a signal to noise ratio (SNR), a signal to interference and noise ratio (SINR), a bit error rate (BER), and a packet error rate (PER).*

*57. A wireless communication device comprising:*

*a plurality of dipole antennae, wherein the wireless communication device establishes a wireless communication channel with one or more remote wireless communication devices through at least a subset of such antennae; and*

*a transmit unit, coupled with at least a subset of the dipole antennae, to selectively process a plurality (k) of spatial-multiplexed streams to produce a plurality (k') of coded spatial-multiplexed streams, and to map at least a subset of the plurality (k') of coded spatial-multiplexed streams to a plurality of (M) of the antennae for transmission to the remote receiver via the wireless communication channel, and to control one or more aspects of one or more of the selective processing spatial-multiplexed streams and the mapping of the coded spatial-multiplexed streams based, at least in part, on a received indication of a quality parameter associated with the wireless communication channel, the indication of the quality parameter associated with the wireless communication channel is received from a remote receive unit and represents one or more of a received signal strength indication (RSSI), a crossing level, a signal to noise ratio (SNR), a signal to interference and noise ratio (SINR), a bit error rate (BER), and a packet error rate (PER).*

* * * * *